United States Patent [19]

Karlsson et al.

[11] Patent Number: 5,421,718

[45] Date of Patent: Jun. 6, 1995

[54] METHOD FOR PRODUCING A VOLUMETRIC FLOW CENTRAL VALUE

[75] Inventors: Jan Karlsson, Västra Frölunda; Jan Dahlgren, Gothenburg, both of Sweden

[73] Assignee: AB Volvo, Sweden

[21] Appl. No.: 201,172

[22] Filed: Feb. 24, 1994

Related U.S. Application Data

[62] Division of Ser. No. 776,799, Oct. 15, 1991, Pat. No. 5,304,336.

[30] Foreign Application Priority Data

Oct. 24, 1990 [EP] European Pat. Off. ........... 90850355

[51] Int. Cl.⁶ ............................................. B29C 45/44
[52] U.S. Cl. ................................... 425/577; 249/96;
264/328.7; 425/DIG. 58
[58] Field of Search ............... 425/577, DIG. 58;
249/96, 144, 145; 264/328.7, 328.8, 242, 250,
255, 262, 267, 264

[56] References Cited

U.S. PATENT DOCUMENTS 3,843,088 10/1974 McLoughlin et al. ............ 425/577
4,999,142 3/1991 Fukushima et al. ............ 264/328.8

*Primary Examiner*—Tim Heitbrink
*Attorney, Agent, or Firm*—Lerner, David, Littenberg, Krumholz & Mentlik

[57] ABSTRACT

A flow control valve including a movable part and a housing for accommodating the movable part may be produced by molding the components in sequential steps. Preferably, the housing is molded in a first step and the movable part is molded in an at least partially closed position in a second step in the same mold. This method enables the surface of the housing to serve as at least a portion of the mold for forming a substantially sealing portion of the movable part such that a very close tolerance between these components is achieved. The movable part is preferably a butterfly disc and the housing is preferably a butterfly valve housing.

9 Claims, 4 Drawing Sheets

METHOD FOR PRODUCING A VOLUMETRIC FLOW CENTRAL VALUE

This is a division of application Ser. No. 07/776,799, filed on Oct. 15, 1991, now U.S. Pat. No. 5,304,336.

FIELD OF THE INVENTION

The present invention relates to a method of producing a volumetric flow control valve comprising a valve housing having a through channel and a valve body rotatably arranged about an axis in said channel. Such a valve can, for example, be used in order to control the flow of air into an internal combustion engine.

BACKGROUND OF THE INVENTION

A general problem with devices for controlling flow volumes using a flow controlling device which is pivotally arranged about an axis within a channel is that they are relatively expensive, since the production thereof is relatively complex. The production very often comprises several steps with different kinds of treatment, such as moulding, grinding, turning, assembly, control of sealing capacity, etc. It is common knowledge that each extra treatment implies an increase in the final price of the product, which is undesirable.

A method for producing a ball valve is disclosed in FR-A-1 327 745 in which a valve body in the shape of a sphere with a through passage is first prefabricated and then placed in a mold. A core is inserted through said passage, which core, together with the mold and valve body, delimits a cavity which corresponds to the valve housing. A plastic material is then injected into said cavity to thereby form said housing. Because the valve body in effect acts as a core during the molding of the housing, the housing needs no further machining to acomodate the valve body. A similar method to that described above is disclosed in FR-A-2 028 256, though in this case a two part core is used. Because molding of the housing occurs with the valve body in its fully open position, the interacting surfaces of the housing and valve body totally correspond to each other only in said fully open position. Since it is normally desirable to have the best possible sealing relationship in a position other than fully open, the methods according to said two French documents do not always provide a fully satisfactory valve arrangement.

From U.S. Pat. No. 4,702,156 it is known to use thermal moulding in order to produce a housing in a first step and movable parts for that housing in a second step in one and the same tool. This known method, however, relates to a through-flow channel with movable plates mounted therein for directing air flow, which movable parts steer the air flow in a desired direction but do not control the volume of flow. Similar methods are also described in GB-A-2 117 694 and FR-A-2 316 060.

There is a demand within the motor industry for a volumetric flow control valve for controlling the flow of air into an internal combustion engine. Accordingly, it is a general goal within the motor industry to reduce the number of parts, since this leads to lower production and assembly costs. Another general goal, which has been developed more recently, is to try to optimize the included components to improve comfort and energy consumption. This latter goal has, for instance, resulted in designs which permit a "smooth" driving style. One result of such a design is that butterfly plates have been provided with flow decreasing means in order to optimize the relation between the effective through-flow area as a function of the rotation of the butterfly and thereby counter-acting the undesired, non-linear relation (in certain cases almost a sinus function) which leads to a jerky manner of driving at small opening angles. Known butterflies have such flow decreasing means in the form of separate parts which protrude transversely (so called rucksacks) which have been fitted to the base- surface of the butterfly. Accordingly, an optimization in accordance with the latter object has in this case led to a non-desired result concerning the number of parts.

The need for accurately aligned and sealing components in butterfly valve arrangements is typified by the teachings of U.S. Pat. Nos. 4,740,347 and 3,771,764.

SUMMARY OF THE INVENTION

It is an object of the present invention to provide a method of producing a volumetric flow control valve which overcomes the disadvantages mentioned above.

It is a further object to provide a method of producing a volumetric flow control valve in which an improved sealing is obtained between the valve body and the valve housing in an at least partially closed valve body position.

These objects are achieved by a method of producing a volumetric flow control valve comprising a valve housing having a through channel delimited by a boundary surface along which flow can take place, and a valve body rotatably arranged about an axis in said channel, said valve body presenting a peripheral surface, a region of which, in a predetermined at least partially closed position of said valve body, is in sealing contact with said boundary surface, and said sealing contact in said predetermined position is assured by relative molding of said surfaces in said predetermined position. By the term "relative molding" is meant that the contacting surface of one of the components of the control valve is a molding of the other.

These objects are further achieved according to the present invention by a method of producing a volumetric flow control valve comprising a valve housing having a through channel delimited by a boundary surface along which flow can take place, and a valve body rotatably arranged about an axis in said channel, said valve body presenting a peripheral surface, a region of which is in sealing contact with said boundary surface, and said sealing contact in said predetermined position being assured by, in a first step, molding said valve housing and, in a second step, molding said valve body within said housing.

The volumetric flow control valve which is produced according to the above methods has a movable part which, in a predetermined position, must sealingly interact with certain parts of the surrounding housing. It is obvious for the skilled man that the expression "sealingly" also relates to devices having a certain leakage flow. For internal combustion engines, for example, it is preferred to have a total volume of flow leakage of about 4 m³/h at idling, a flow which advantageously may be mainly supplied by means of leakage flow through a butterfly valve.

BRIEF DESCRIPTION OF THE DRAWINGS

The invention will be described in more detail in the following by way of example only and with reference to the annexed drawings, in which.

DETAILED DESCRIPTION OF THE PREFERRED EMBODIMENT

Figure 1:
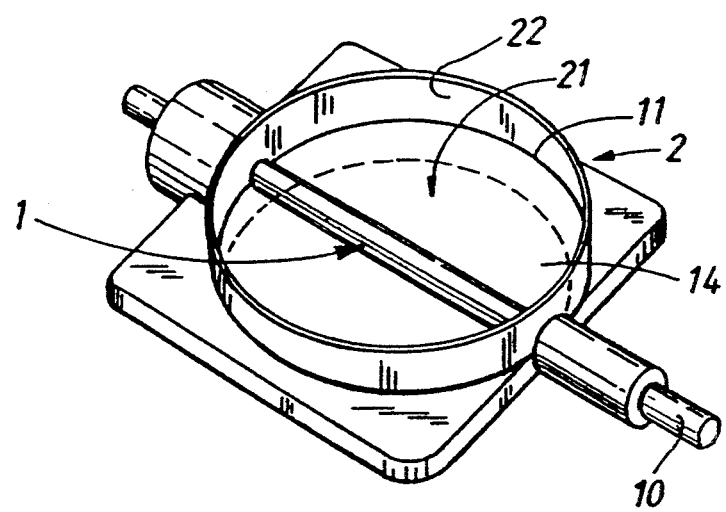
FIG. 1 is a perspective view of a butterfly valve housing with a butterfly disc unit produced by a method according to the invention.

In FIG. 1 a perspective view of a valve housing 2 is shown within which a butterfly disc unit 1 is rotatably arranged. The butterfly disc unit 1 has a sealing outer edge 11, which, in the shown position, is intended to contact the inner surface 22 of the valve housing, which surface delimits a through channel 21. By means of the positioning of the butterfly disc unit 1, the flow through the channel 21 can be controlled. When the disc unit 1 is positioned transversely in relation to the channel, its sealing edge 11 will accordingly be in sealing contact with the inner peripheral surface 22 of the channel 21, so that any through-flow is prevented. A rotation of the butterfly disc unit from this position implies, which is known per se, a successive opening of the channel 21.

Figure 2A:
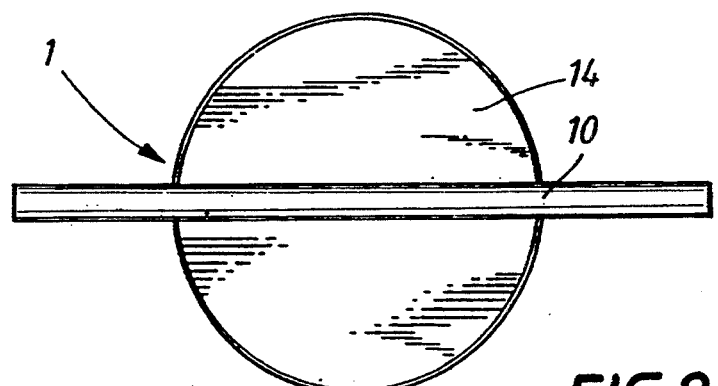
FIGS. 2a and 2b are two different side views of a butterfly disc unit produced by a method according to the invention.

In FIGS. 2a and b there are shown two different side views of such a disc unit. The disc unit 1 consists of a disc-shaped part 14 and a spindle 10. The sealing edge 11 is the outer peripheral edge of the disc part. The disc part and the spindle are manufactured as an integral unit in a manner which will be explained in the following.

Figure 3B:
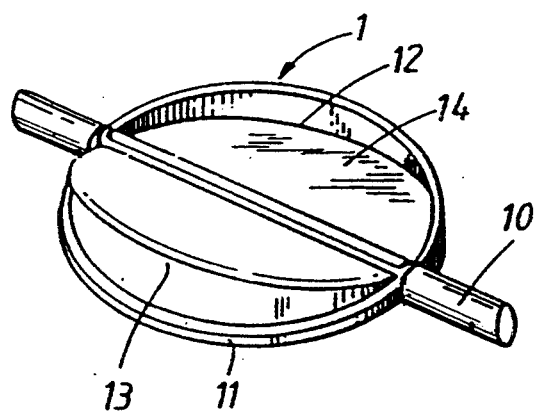
FIGS. 3a and 3b show a preferred embodiment (perspective view and transverse section) of a butterfly disc unit produced by a method according to the invention.
Figure 3A:
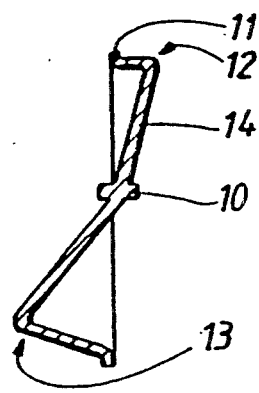

In FIGS. 3a and b there is shown a preferred embodiment of a butterfly disc unit in cross-section and a perspective view respectively. It is evident that the butterfly has a relatively complex configuration, which is due to the disc being designed with flow reducing means 12, 13 (so called rucksacks). The object of these flow reducing means is to optimize the effective through-flow of the channel 21 as a function of the rotational angle. In a preferred embodiment one of the rucksacks 12 protrudes about 15° from a plane which includes the sealing edge 11, whereas the second rucksack protrudes about twice that but in the opposite direction. For a conventional butterfly disc (FIG. 2) the flow through the channel is a non-linear function, which implies that in a certain position a small rotation of the spindle 10 leads to almost no change of the through-flow, whereas, in another position, the same small rotation leads to a large change of the volumetric through-flow. This is a phenomenon which is not always desirable. This problem can be prevented by forming the butterfly disc with so-called rucksacks 12, 13 since these flow-reducing means are placed and designed in such a manner that the effective volumetric through-flow of the channel 21 varies linearly with respect to the rotational angle of the axis 10, a fact which, from a controlling aspect, is very often seen to be optimal.

Figure 4:
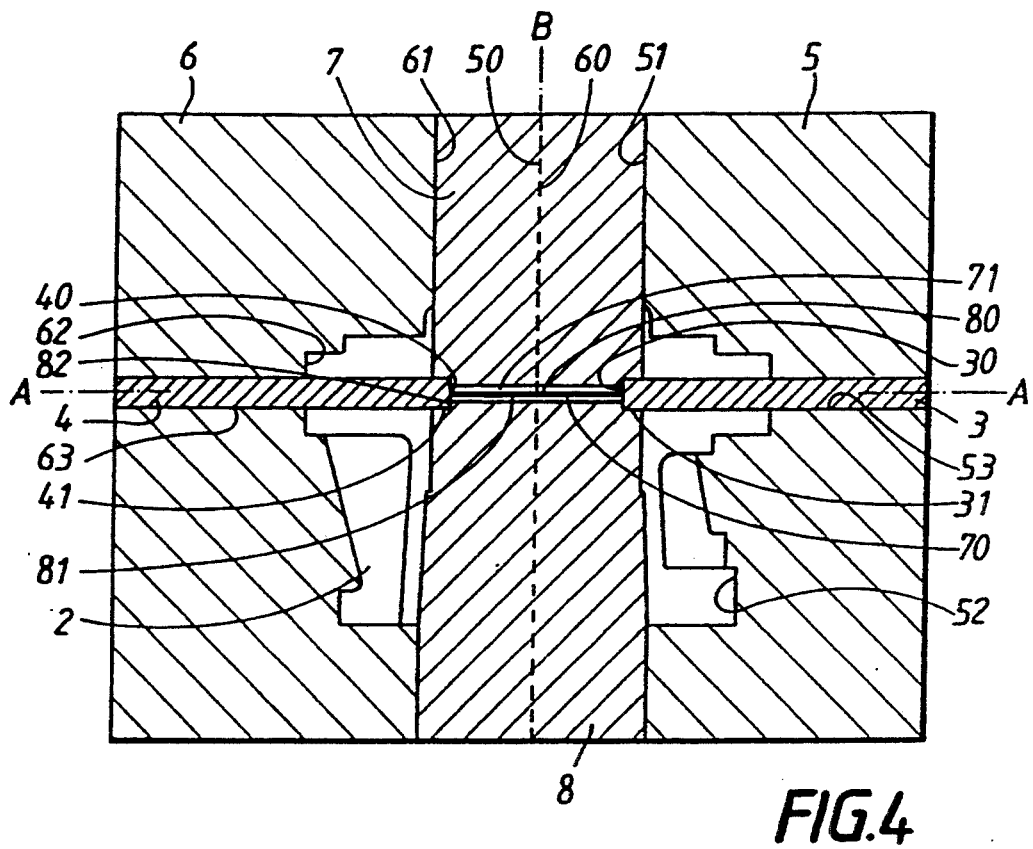
FIG. 4 shows a tool according to the invention in a first position.
Figure 5:
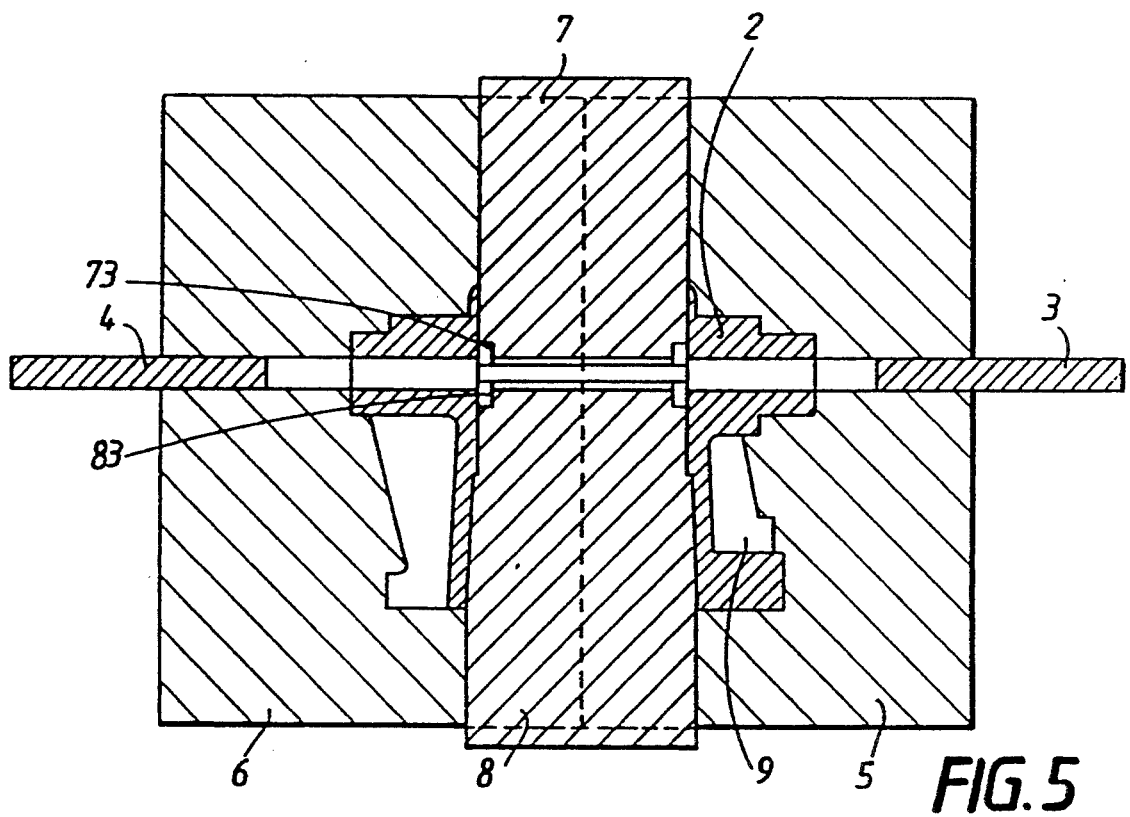
FIG. 5 shows the same tool as in FIG. 4 in a second position.

In FIGS. 4 and 5 there is shown a tool for production of a butterfly disc unit and a housing in accordance with the invention. The production is performed in two steps whereby the housing is produced in the first step, having the different parts of the tool positioned in accordance with FIG. 4, and the butterfly disc unit 1 is produced in a second step, whererby the different parts of the tool are positioned in accordance with FIG. 5. In the preferred case, some kind of-thermoplastic material is used, whereby the plastic material that is used in the first production step has a melting temperature that preferably exceeds the melting temperature of the plastic material which is introduced in the second production step, and which does not adhere to this other one.

The following method in accordance with the invention will be clarified with reference to FIGS. 4 and 5. The tool for production of the device according to the invention comprises two outer mold parts 5, 6, which principally are movable parallel to a first plane A. Accordingly, these two outer mold parts have a dividing plane which is defined by the dividing surfaces 50, 60. This dividing plane coextends with a second plane B, which is perpendicular to the first mentioned plane A. A circular through hole coaxial with said dividing line 50, 60 is accordingly formed by two semi-circular recesses 51 and 61 respectively, in each part of the mold. Moreover, these mold parts 5, 6 have further recesses 52, 62 which are positioned adjacent to the through hole. These recesses 52, 62 define the delimiting surfaces which finally determine the outer contours of the housing, inclusive of a strengthening web 9 extending from each side thereof.

Furthermore, each mold part 5, 7 has a through hole 53, 63 which has a diameter substantially smaller than that of the channel delimited by the circular recesses 51 and 61 and which extends in said plane A, i.e. perpendicular to the channel and plane B. These holes 53, 63 are coaxially arranged. Two cores 3, 4 (in the following, called "pins") are intended to be movable within said latter holes 53, 63. These pins have a uniform circular cross-sectional surface and are accordingly intended to be moved in the plane A. The diameter of the two pins 3, 4 corresponds essentially to the diameter of the holes 53, 63. Two other cores 7, 8 are intended to be moved along plane B towards and away from each other within the channel which is defined by the semi-circular surfaces 51, 61 of the outer mold parts 5, 6. Each core 7, 8 has a diameter which corresponds to the diameter of the channel where it is intended to be positioned. Each core has at its end-surface facing the other core a central diametrically extending groove 71, 81. Additionally, and as can be seen from FIG. 5, each core has recesses 73, 83 which are centrally positioned about the dividing surfaces 70, 80, and which recesses are transversely directed and circular and have a configuration which corresponds to the configuration of the inwardly facing end 30, 40 of each respective pin. In the preferred case, accordingly, this is a circular recess having a diameter which corresponds to that of the end of each respective pin. This latter recess is (preferably) coaxially arranged with respect to said diametrically extending groove 81, 71. The radial extension of the groove 71, 81 is, at least at the borderline between the recess 73, 83 and the groove 71, 81, smaller than each respective recess 83, 73.

As has already been mentioned, the production of the disc unit 1 and the housing 2 may be made in two steps, whereby one and the same tool is used and the housing is molded in a first step (FIG. 4) whereafter four parts 3, 4, 7, 8 of the tool are moved outwardly to new positions (FIG. 5) so that the butterfly disc unit can be molded in a second step. Thus, the newly molded housing forms one of the outer delimiting surfaces when molding the butterfly disc unit.

Figure 6:
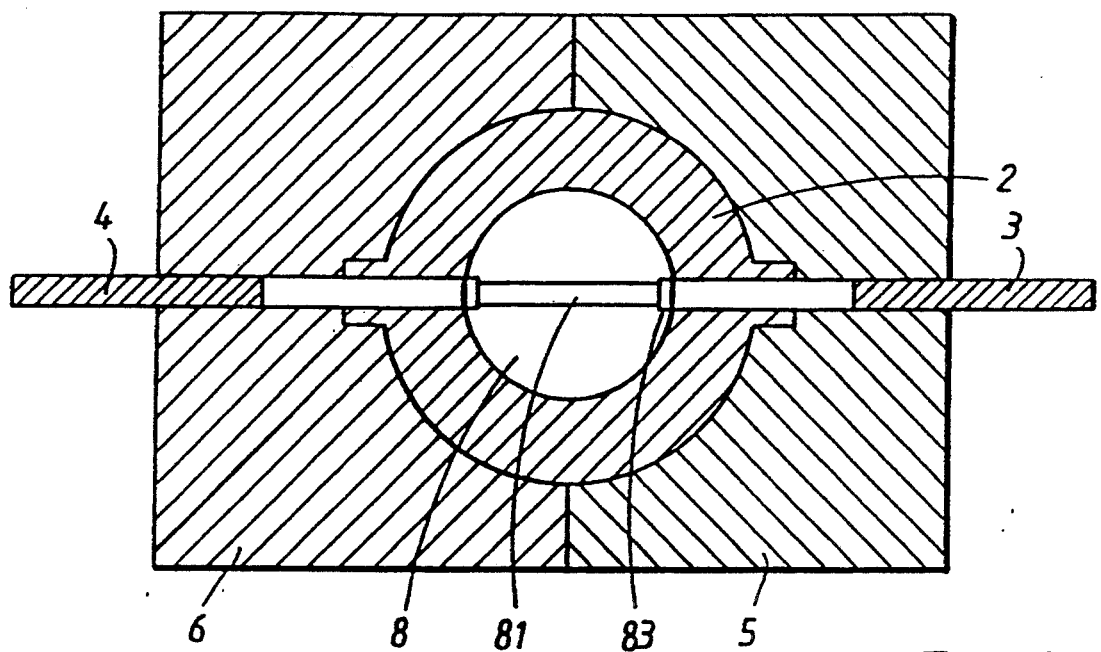
FIG. 6 shows a section in the plane A in FIG. 5, and, FIG. 7 shows a modified embodiment of a device according to the invention.

In FIG. 6 there is shown a cross-section taken along plane A of FIG. 5. This cross-section clearly shows the recesses 83 that are made in each core 8, in order to seal the ends of the groove 81 by means of the pins 3, 4. The cavity defined by grooves 71, 81 forms a reinforcement for the disc unit 1. Further, the extension of the cavity which forms the disc unit is represented. When using a tool 3, 4, 5, 6, 7, 8 in accordance with the invention, one proceeds as follows in order to produce a housing 2 with a disc unit 1 in accordance with one method of the present invention. In a first step, the housing 2 is molded. Hereby, the outer mold parts 5, 6 are located in a contacting position, so that the dividing surfaces 50, 60 sealingly contact each other. The cores 7, 8 are also brought together in the recesses 51, 61, which forms a mold within the two mold parts 5, 6, so that the adjacent end-surfaces 70, 80 of the cores 7, 8 sealingly contact each other along a substantial part of said adjacent end-surfaces. The position of each core is such that the diametrically extending grooves 71, 81 are parallel and coaxial and further coaxially positioned in relation to the holes 53, 63 which are present in plane A. Accordingly, there is everywhere sealing contact along the adjacent end-surfaces of the cores, except at the transverse recesses 73, 83. Here, however, sealing is achieved by means of the pins 3, 4, i.e. by positioning the pins in an inner location so that each pin 3, 4 with its respective end 30 and 40 sealingly interacts with said recesses 73, 83. What now remains is a cavity being sealed off, which cavity corresponds to the configuration of the housing 2. The cavity is delimited inwardly in plane B by a circular channel whose mold is determined by the cores 7, 8. The cavity presents a second through hole, which extends in a first plane A and whose mold is determined by the mold of the pins 3, 4. Accordingly, the housing 2 is produced by supplying a plastic material into said cavity. The plastic material is preferably thermoformed.

When the housing has solidified sufficiently, i.e. in the preferred case, when the temperature has dropped sufficiently (has been sufficiently cooled), the second step can be initiated. In the second step, the actual disc unit is produced in situ within the housing 2. In this second step, the outer mold parts 5, 6 are kept in their respective positions. The cores 7, 8 and the pins 3, 4, however, are moved. The two cores 7, 8 are moved apart to a position where they do not contact each other, so that a certain distance is created therebetween, which distance determines the thickness of the material of the disc portion. The two pins 3, 4 are also moved to a retracted position where the distance between the facing end-surfaces 31, 41 determines the length of the spindle of the disc. These mentioned positions are clearly shown in FIG. 5. Since the housing 2 is kept in the mold, a cavity is shaped which, at the actual disc portion 14, is delimited by the end-surfaces 70, 80 of the cores and which, at the spindle portion 10, is partly delimited by the through hole of the housing 2 and partly by the through hole 53, 63 in each mold part and which, as has already been mentioned, has a length that is determined by the position of the pins 3 and 4 respectively. Consequently, the disc unit 1 can now directly be formed by supplying a second, shapable mass. If a thermoplastic material is used, one of the conditions is that the temperature of this second mass does not exceed the melting temperature of the housing 2 (in its latter state). After appropriate cooling, the housing 2 with the butterfly disc unit may be taken out of the mold. To do so, the cores 7, 8 are withdrawn from the mold along the plane B and the outer mold parts 5, 6 and the pins 3, 4 are withdrawn along plane A. An advantage with this method is that possible irregularities on the surface of the housing are directly shaped on the disc during the molding, so that a perfect sealing contact is always achieved between the housing and the disc.

By using different plastic materials with different qualities, it is possible to change certain variables in order to optimize a desired variable. It is prior knowledge that varying amounts of shrinkage (or no shrinkage at all) of the various parts 1, 2 of the component, can be achieved by adding different substances or by using different pressures in the mold. Accordingly, it is possible to shape a housing and a disc so that the disc can only be moved against a large resistance but where the sealing is extremely good, by controlling it in such a manner that the housing 2 shrinks more than the disc portion. In a preferred embodiment, the disc portion is given a relative shrinkage of 0.3% whereas the housing is controlled to have a shrinkage of about 0.5%. If, on the other hand, the sealing qualities are not of the highest priority, and, instead, the highest priority is that the disc unit should be easily rotatable, it is possible to use a relation of shrinkage so that the disc portion shrinks more than the housing 2. This, however, can also be achieved by chilling the housing 2 so much that all shrinkage occurs (which normally is not the case) before the second step is initiated. After the shrinkage has taken place, the diameter of the cavity which is to mold the disc portion will be smaller. Therefore the disc portion in its turn will shrink to a diameter which in turn will be smaller than the delimiting surfaces of the housing. Accordingly, it is also possible in this manner to produce a device where the parts are easily moved in relation to each other.

Another factor which is possible to vary, as has already been mentioned before, is how highly the mass is pressurized within the form. High pressure leads to expansion of the finished product whereas low pressure leads to the opposite effect. Accordingly, it is also possible to vary the pressurization of the mold in order to achieve optimal interrelation between the two parts which are molded in the two different steps.

Figure 7:
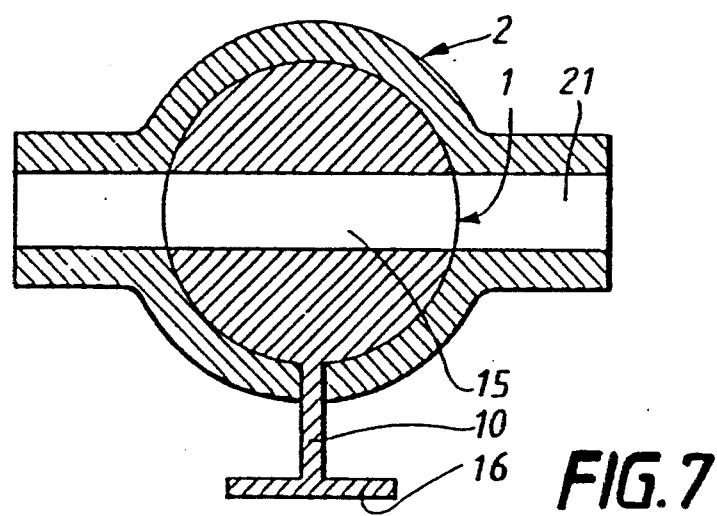

FIG. 7 shows a modification according to the invention, i.e. a ball well comprising a housing 2 and a ball 1. The ball comprises a through hole 15, which, depending on its position, enables flow through the channel 21 of the housing 2. The ball is rotatably arranged about a shaft 10 and is preferably rotated by means of a manoeuvre device 16, which may be integrally formed with the shaft 10.

In the method of production of such a modified device in accordance with the invention, the ball is firstly produced in a separate tool in a first step. Thereafter, the ball is positioned in a second tool, which has two outer mold parts and two cores, whereby the cores are preferably movable in a plane which is in line with the normal of the dividing plane of the outer mold parts, so that the shaft 10 of the ball 1 is positioned in the dividing plane. The outer mold parts have inner surfaces whose configurations determine the outer shape of the housing. The cores have a diameter which is at least of the same size (or can be larger) as the diameter of the hole 15 of the ball 1 and are sealingly positioned in relation to a respective opening of the ball 1, as are the mold parts, before the shapeable mass is introduced. The housing is molded when the ball is located in a closed or partially closed position, i.e. in a sealing position. The reason is that this is the position wherein optimal interaction between the two sealing parts of the ball 1 and the housing 2 respectively is attained in order to achieve optimal sealing ability. A prerequisite in order to obtain this is that the channel 15 is sealed off during molding. This sealing-off can be achieved by means of one core (not shown), or two, which seals the channel 15 from inside, i.e. either totally fills the channel 15 or just blocks each end. After molding, these latter cores can be removed.

Alternatively, a casting mold can be used which in principle corresponds to the one shown in FIGS. 4 and 5. A difference in relation to the above-described tool is that the cores 7, 8, have to be formed either with hemispherical end-surfaces corresponding to the radius of the ball 1 or, in accordance with the above, with the diameter that seals the opening of the ball. Further, the ball is preferably molded with diametrically positioned circular recesses whose diameter corresponds to the diameter of said pins 3, 4. When molding the housing 2, the cores 7, 8 are positioned in order to seal against the hole 15 of the ball 1 and the end-surfaces 30, 40 of the pins within said latter recesses. When the different mold parts (accordingly also the outer mold parts 5, 6) are sealingly positioned in their respective positions, it is possible to supply the plastic mass, which will form the housing. Thanks to the pins 3, 4, it is possible to use a different shaft material (e.g steel) for the ball, which sometimes could be preferred.

That which has been described above can be varied within the scope of the following claims. Accordingly, which has already been indicated, the invention is not limited to a method of producing a housing and a disc unit intended for use with gases, but can also be used for liquids. Further, as also has been indicated, hardening plastics can be used and, of course, in different combinations, e.g. a disc made of hardening plastics and a housing made of thermoplastics.

Figure 2B:

Differing from the method that is presented in relation to FIGS. 2 and 5, it is also possible to mold the disc portion in an obliquely positioned state within the cores, i.e. without using the housing 2 for the sealing edge 11 of the disc. For such a method it is not necessary to reposition the cores 7, 8 from the first step to the second, but it is only necessary to reposition the pins 3, 4 in order to enable the plastic mass to reach the cavity between the two cores. The disadvantage, however, is that the disc is then not exactly molded in relation to the housing. Moreover, it is to be realized that the invention is not solely limited to only two interacting parts, but can also be directed to any of the parts per se, especially a disc in accordance with above.

It is evident for the skilled man that the mass used for the molding can be chosen from a plurality of different possible materials, such as ABS-plastics, polyethylene, etc (which among other things also is known from a number of documents within the area, e.g. U.S. Pat. No. 4,702,156). Further, it is evident that runners (not shown) can be positioned in many different ways, but that this is not an essential feature of the invention.

What is claimed is:

1. A mold for producing a flow control valve including a valve housing, a channel extending through said valve housing and defining a boundary surface, and a valve body rotatably arranged in said channel about an axis of rotation and having a peripheral surface, said peripheral surface and said boundary surface together forming an interengaging pair of surfaces in a predetermined at least partially closed position of said valve body, said mold comprising at least two outer mold parts movable in a first plane between an extended position and a retracted position, confronting surfaces of said mold parts in said extended position contacting one another to define a through passage extending in a second plane perpendicular to said first plane, at least a portion of said through passage having a predetermined diameter in said extended position of said mold parts, said confronting surfaces of said mold parts in said retracted position being spaced apart from one another, opposing core members arranged in said mold parts and slidable in said through passage between an extended position and a retracted position, confronting surfaces of said core members in said extended position contacting one another to define said boundary surface of said -valve housing, said confronting surfaces of said core members in said retracted position defining a portion of a molding cavity for said valve body, and at least one pin member assembled in one of said mold parts and movable in a sliding direction between an extended position and a retracted position, an inner end of said at least one pin member in said extended position extending into said through passage for engagement with one of said core members, said inner end of said at least one pin member in said retracted position being spaced apart from said one core member, said mold having a first configuration for molding said valve housing in which said mold parts, said core members and said at least one pin member are in said extended positions and a second configuration for molding said valve body in which said mold parts are in said extended position and said core members and said at least one pin member are in said retracted positions.

2. The mold as claimed in claim 1, further comprising another pin member assembled in another one of said mold parts and movable in said sliding direction between an extended position and a retracted position, an inner end of said another pin member in said extended position extending into said through passage for engagement with another one of said core members, said inner end of said another pin member in said retracted position being spaced apart from said another core member, said another pin member residing in said extended position in said first configuration of said mold and in said retracted position in said second configuration of said mold.

3. The mold as claimed in claim 2, wherein said pin members are axially aligned in said mold parts for movement in said first plane between said extended and retracted positions.

4. The mold as claimed in claim 3 wherein said inner ends of said pin members in said retracted position are spaced apart by a distance greater than said predetermined diameter.

5. The mold as claimed in claim 1, wherein said at least one pin member has a circular cross-section.

6. The mold as claimed in claim 5, wherein said at least one pin member has a diameter less than said predetermined diameter.

7. The mold as claimed in claim 1, wherein said flow control valve comprises a butterfly valve and said valve body comprises a disc, said confronting surfaces of said core members in said retracted position defining molding surfaces for said disc.

8. The mold as claimed in claim 7, wherein said disc includes a spindle formed integrally along said axis of rotation, said confronting surfaces of said core members including a groove defining a molding surface for said spindle.

9. The mold as claimed in claim 8, wherein said groove extends in said sliding direction.

* * * * *

UNITED STATES PATENT AND TRADEMARK OFFICE
CERTIFICATE OF CORRECTION

PATENT NO. : 5,421,718
DATED      : June 6, 1995
INVENTOR(S) : Karlsson, et. al.

It is certified that error appears in the above-indentified patent and that said Letters Patent is hereby corrected as shown below:

Title page, item [54] and col. 1, lines 1-2, in the title should read--
MOLD FOR PRODUCING A VOLUMERTRIC FLOW CONTROL VALVE
Column 4, line 30, "7" should read --6--.
Column 8, line 23, "said -valve" should read --said valve--.

Signed and Sealed this

Twelfth Day of September, 1995

Attest:

BRUCE LEHMAN

*Attesting Officer*    *Commissioner of Patents and Trademarks*